Sept. 15, 1959     D. R. SAND     2,904,150
CLUTCH PLATE
Filed April 11, 1957

INVENTOR.
Darrel R. Sand
BY
HIS ATTORNEY

United States Patent Office 2,904,150
Patented Sept. 15, 1959

2,904,150

CLUTCH PLATE

Darrel R. Sand, Plymouth, Mich., assignor to General Motors Corporation, Detroit, Mich., a corporation of Delaware Application April 11, 1957, Serial No. 652,274

10 Claims. (Cl. 192—107)

This invention relates to clutch plates and is particularly concerned with clutch plates for use in multiple plate clutches wherein the plates are designed to dampen the chatter thereof upon engagement of the clutch.

In automatic transmissions and the like, multiple disc clutches are frequently used as torque transmitting devices. These clutches comprise a clutch pack having two sets of plates, wherein one set of plates are the drive plates while the other set are termed the driven plates. Each set of plates is normally splined either externally or internally of the individual plates to a member which either drives or is driven and the plates are engaged through the use of pressure members hydraulically operated to cause the plates to engage one another. A clutch of this general character is clearly shown in Thompson Patent 2,357,295, assigned to the assignee of the present invention.

In most instances, these clutch packs are of the wet type, that is to say, they operate in a bath of fluid such as oil or other cooling medium. In general, this type of clutch, upon engagement thereof under certain conditions and with certain clutch facings applied to the several plates of the clutch, there is a tendency to chatter. This usually occurs as the clutch is being engaged and once full engagement is reached, the chatter is eliminated. However, the tendency of certain clutches to chatter is annoying and frequently causes users of the vehicle in which the clutch operates to seek service or repair when actually there is nothing basically wrong with the clutch so far as its operative characteristics are concerned.

Since chatter in the clutch is annoying and since it is admittedly better to have a quiet, noise-free device, I have devised means for reducing and/or eliminating clutch noise such as clutch chatter and the like. The present invention is directed to a clutch plate design specifically for this purpose wherein, due to the basic constructional details of the plate, the tendency toward chatter is eliminated and the plate, when embodied in a transmission, is quiet in its operation.

It is, therefore, the main object of this invention to provide a clutch plate which is chatter free and noiseless in its operation when embodied in a clutch structure.

Another object of the invention is to provide a clutch plate for use in a clutch pack wherein the plate is designed so as to eliminate noisy operation of the clutch assembly through inherent structural details within the clutch plate.

In carrying out this object, it is a further object to provide a clutch plate wherein facings at opposite sides of the plate are capable of limited yieldable radial displacement from one another whereby, upon initial engagement of the clutch plate with another clutch member, there is relative radial movement between the two faces thereof which eliminates chatter and produces a noise-free clutch which is fully as efficient as the usual type clutch plate.

Further objects and advantages of the present invention will be apparent from the following description, reference being had to the accompanying drawings wherein preferred embodiments of the invention are clearly shown.

Figure 1:
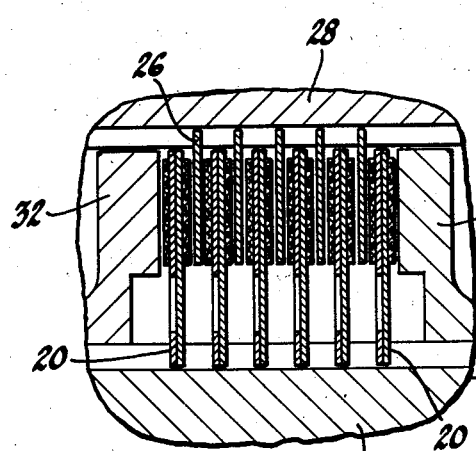
Figure 1 is a fragmentary sectional view of a portion of the clutch pack as used in an automatic transmission showing the driving and driven plates in position within the clutch pack wherein the elements are shown diagrammatically.

Conventional clutch plates of the general character described usually include facings at opposite sides thereof which facings are adapted to engage other plates generally made of plain steel. In Figure 1, a plurality of faced plates 20 are shown which are splined to a member 22 of a clutch pack 24. Plain plates 26 are provided and are alternated with the faced plates 20. The plain plates are splined to a second operating member 28. The members 22 and 28 are rotatable relative to one another and the associated plates obviously move as a unit with their associated member. Either member 22 or 28 may be the driving member as desired. Due to fluid within the clutch, the plates are normally held in spaced relation and this condition may be added by forming one set of the plates with a wavy design or with a coned design whereby the plates normally tend to separate except when in pressure engagement. Pressure members 30 and 32 at opposite ends of the pack are actuated by means, not shown, to move toward one another whereupon the plates are forced into torque transmitting engagement, it being understood that if the plates are waved or coned, they will be flattened out by the action of the pressure members for full engagement. The pressure members 30 and 32 are actuated by pneumatic or hydraulic means, not shown, as is well known in the art.

Figure 2:
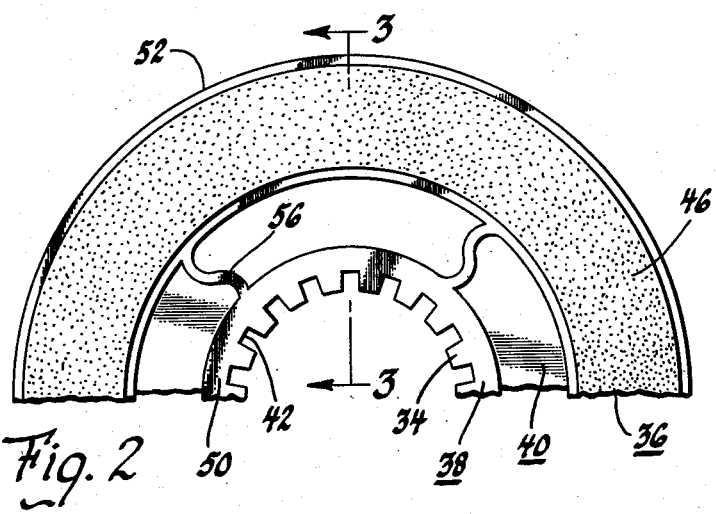
Figure 2 is a fragmentary view of one type of clutch plate embodying the present invention.
Figure 3:
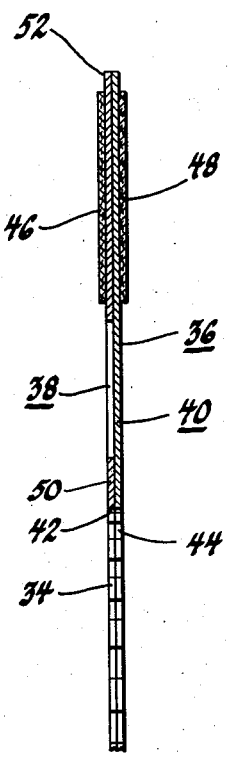
Figure 3 is a section taken through line 3—3 of Figure 2.

As previously set forth, if the opposite sides of the faced plates have some yieldable movement relative to one another, I have found that the chatter and noise of engagement, or disengagement as the case may be, will be eliminated and, to this end, I have provided an entirely new type of clutch plate, for example, as shown at 36 in Figures 2 and 3. The plate 36 comprises two disc members 38 and 40 which are juxtaposed and each of which has a central aperture 42 pierced therethrough. The apertures 42 include, around their peripheries, a plurality of splines or keys 34 which are adapted to engage spline or key slots in the member 22. Each of the plates 38 and 40 include a facing 46 and 48, respectively, adjacent their outer periphery and these facings may be any suitable friction material such as cork, resin impregnated paper and the like which are well known in the art and which are disclosed in more detail in Almen-Carnegie Patent 2,733,798, assigned to the assignee of the present invention. It should be understood that these facings form no part of the present invention and may be of any material suitable for the purpose. The discs 38 and 40 differ in that the disc 40 is rigid with respect to possible relative radial movement of its periphery with respect to its hub portion, whereas the disc 38 is yieldably radially movable at the periphery thereof relative to its hub portion. This is accomplished by making the disc 38 of the type shown in Figure 2 wherein a splined hub portion 50 is provided together with an annular peripheral portion 52 which carries the facing 46. The portions 50 and 52 are connected by a plurality of spaced sinuous spokes 56 which are yieldable. In this manner, when the hub 50 is rotated, the peripheral portion 52 also rotates. However, there is a tendency toward relative yieldable radial movement between the peripheral portion 52 and the hub portion 50 when a restraining force is applied to the facing 46, that is to say, when the clutch commences to engage. The disc 40, on the other hand, has a splined central aperture 44 and is otherwise a solid disc of metal which includes the facing 48 on one peripheral surface thereof. The perforated disc 38 and the solid disc 40 are juxtaposed with their facings on opposite sides and are preferably spot-welded adjacent the hub portion 50 of the disc 38. In this manner, the hub portions of the two discs must rotate as a unit whereas the peripheral portions thereof are capable of relative radial movement within predetermined small limits. Thus, when the clutch plates in the clutch pack begin to engage, it is possible for slight radial movement between portions of each plate adjacent the engaging surfaces thereof for eliminating the chatter which frequently occurs in clutches of this character.

It is to be understood that the plates may also be formed so that the faced peripheries thereof are not contiguous but are slightly out of contact with one another which creates a cushioning effect upon engagement of the clutch. Also, the peripheral portion of one of the plates may be slightly waved or coned while the other plate may be flat for the same purpose, all of these modifications coming within the scope of this invention.

Figure 4:
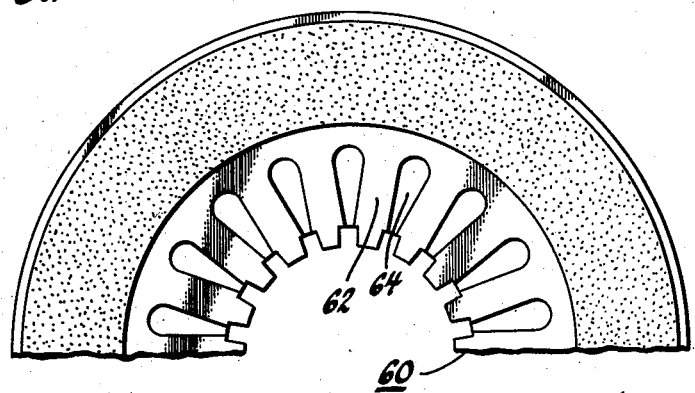
Figures 4 and 5 are modified designs of the clutch plate and Figure 6 is a section taken on line 6—6 of Figure 5.

Figure 4 shows another type of disc 60 which may be substituted for the disc 38 and may be used in connection with a disc 40. In this instance, the disc 60 includes radially extending spoke portions 62 which are formed by perforating the disc radially with a number of perforations 64. In either case, the same end is accomplished; namely, the peripheral portion of the disc 38 or 60 is made radially yieldable with respect to its hub portion so that there is relative radial movement between the facing thereon and the facing at the other side of the clutch plate 36 which is attached to the rigid disc 40.

It is also within the scope of this invention to provide two perforated discs wherein the degree of radial movement is different in one disc than in the other. In other words, the basic invention is to provide a clutch plate having opposed facings at opposite sides thereof wherein the clutch facings are capable of relative radial movement during engagement and disengagement of the plate and this condition is accomplished through the use of composite clutch plates wherein the two discs used to make up the plate have different degrees of yieldable radial movement relative to their hub or central portions.

Figure 5:
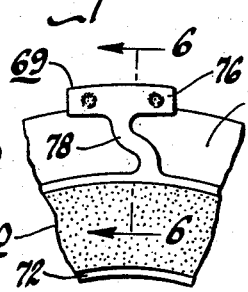
Figure 6:
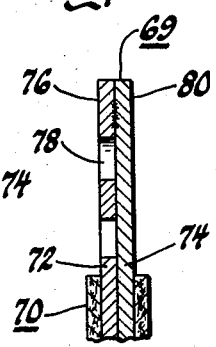

Another modification of the invention is shown in Figures 5 and 6. Here a plate 70 is provided and includes driving means or splines represented at 69 suitably spaced around the outer periphery of the plate. These splines are adapted to engage spline slots in the operating member 28. The plate 70 includes two juxtaposed discs 72 and 74 which may be faced at their outer surfaces. The disc 72 includes splines 76 attached to the main body of the disc by sinuous radially yieldable fingers 78, while the disc 74 which also includes splines as noted at 80, is otherwise of solid construction. The splines 76 and 80 are welded or otherwise attached to form the single driving spline 69. Thus, the opposite sides of the plate 70 are capable of radial displacement. Of course, fingers of other types may be used providing the same result is obtained. Also, the variations suggested in connection with the centrally driven plate may be used to advantage as desired.

While the embodiments of the present invention as herein disclosed constitute preferred forms, it is to be understood that other forms may be adopted.

What is claimed is as follows:

1. A clutch plate assembly, comprising in combination, a plate having a centrally located mounting means, said plate consisting of two members fixedly attached to one another adjacent the centrally located mounting means only and free with respect to one another adjacent their peripheries, one of said members including means to permit yieldable radial displacement within predetermined limits of its outer periphery with respect to its center while the other of said members is relatively more rigid whereby said members are radially displaceable relative to one another adjacent their outer peripheries.

2. A clutch plate assembly, comprising in combination, two discs adapted to be disposed in juxtaposed relation to one another, opposed facing members mounted adjacent the outer peripheries of said juxtaposed discs so as to be disposed at opposite sides of the assembly of the discs, means for securing said discs in fixed nonrotative relation adjacent their central portions only and yieldable means connecting the facing carrying portion of one disc only to its central portion whereby the facing of said one disc is yieldably radially displaceable with respect to the facing on the other disc.

3. The clutch plate assembly claimed in claim 2 wherein the yieldable means consist of sinuous spokes connecting the central portion to the outer periphery of said one disc.

4. The clutch plate assembly claimed in claim 2 wherein the yieldable means consist of radially disposed spokes connecting the central portion to the outer periphery of said one disc.

5. The clutch plate assembly claimed in claim 2 wherein the two discs are axially yieldably compressible adjacent their outer peripheries only.

6. A clutch plate assembly, comprising in combination, two discs adapted to be disposed in juxtaposed relation to one another, means for assembling said discs to one another in fixed nonrotative position adjacent the central portions only of the discs leaving the remaining portions of the discs unrestricted with respect to one another, clutch facings in opposed relation at opposite sides of said disc assembly and adjacent the outer peripheries of the juxtaposed discs, and means associated with one of said discs for permitting the outer periphery portion carrying the facing to be yieldably radially displaceable with respect to the other of said discs.

7. A clutch plate for use in a clutch assembly, comprising in combination, two annular members disposed in face to face relation with one another, and each having means centrally located for mounting the member in nonrotative association to a portion of said clutch assembly and adapted to contact another portion of said clutch assembly adjacent their outer peripheries, one of said members including yieldably deflectable means connecting its outer periphery and its centrally located means and the other of said members including substantially nondeflectable means connecting its outer periphery and its centrally located means whereby the said members are capable of limited radial deflection with respect to one another when the clutch plate is initially engaged.

8. A clutch plate assembly, comprising in combination, two discs adapted to be disposed in juxtaposed relation to one another, means for assembling said discs to one another in fixed nonrotative relation adjacent their outer peripheries leaving the remaining portions of the discs unrestricted with respect to one another, clutch facings in opposed relation at opposite sides of said disc assembly and spaced inwardly from the outer periphery thereof, the inner periphery of one of said discs being yieldably radially displaceable relative to the inner periphery of the other disc.

9. The clutch plate assembly claimed in claim 8 wherein the two discs are axially yieldably compressible adjacent the faced portions only thereof.

10. A clutch plate assembly, comprising in combination, two annular metal members adapted to be disposed in juxtaposed relation to one another, opposed facings mounted adjacent the outer periphery of said juxtaposed members so as to be disposed on opposite sides of the assembly of said members, means for securing the members in fixed nonrotative relation to one another adjacent one of their peripheries only and yieldable means connecting the facing carrying portion of one member only to its nonrotative peripheral portion whereby the facing on said one member is yieldably radially displaceable with respect to the facing on the other member.

References Cited in the file of this patent

UNITED STATES PATENTS

| | | |
|---|---|---|
| 2,136,063 | Swennes | Nov. 8, 1938 |
| 2,146,042 | Wolfram | Feb. 7, 1939 |
| 2,163,884 | LaBrie | June 27, 1939 |
| 2,733,797 | Almen et al. | Feb. 7, 1956 |